(12) United States Patent
Wu

(10) Patent No.: US 11,497,173 B2
(45) Date of Patent: Nov. 15, 2022

(54) GARDEN SHEARS

(71) Applicant: JIIN HAUR INDUSTRIAL CO., LTD., Chang Hua Hsien (TW)

(72) Inventor: Shih-Piao Wu, Chang Hua Hsien (TW)

(73) Assignee: JIIN HAUR INDUSTRIAL CO., LTD., Changhua County (TW)

( * ) Notice: Subject to any disclaimer, the term of this patent is extended or adjusted under 35 U.S.C. 154(b) by 17 days.

(21) Appl. No.: 17/143,538

(22) Filed: Jan. 7, 2021

(65) Prior Publication Data
US 2022/0210980 A1    Jul. 7, 2022

(51) Int. Cl.
   *A01G 3/02*    (2006.01)
   *B26B 13/16*   (2006.01)
   *B26B 13/28*   (2006.01)

(52) U.S. Cl.
   CPC .............. *A01G 3/021* (2013.01); *B26B 13/16* (2013.01); *B26B 13/28* (2013.01)

(58) Field of Classification Search
   CPC .......... A01G 3/02; A01G 3/021; A01G 3/025; A01G 3/0251; B26B 17/00; B26B 17/02; B26B 13/00; B26B 13/16; B26B 13/28
   USPC ........ 30/175, 177, 179, 192, 233, 254; D8/5
   See application file for complete search history.

(56) References Cited

U.S. PATENT DOCUMENTS

| | | | | |
|---|---|---|---|---|
| 188,133 A * | 3/1877 | Hellwig | ................... | B26B 17/02 30/191 |
| 393,197 A * | 11/1888 | Woolley et al. | ......... | A01G 3/02 30/261 |
| 444,635 A * | 1/1891 | Helwig | ................... | B26B 17/02 30/192 |
| 976,121 A * | 11/1910 | Chauncey | ............... | A01G 3/025 30/237 |
| 1,613,480 A * | 1/1927 | Porter | ..................... | B26B 17/02 30/193 |
| 2,260,724 A * | 10/1941 | O'Brien | ................... | A01G 3/02 30/254 |
| 2,816,359 A * | 12/1957 | Hogue et al. | ............. | A01G 3/02 30/250 |
| 2,900,722 A * | 8/1959 | Weisenburger | .......... | A01G 3/02 30/238 |
| 3,235,964 A * | 2/1966 | Young | ...................... | A01G 3/02 30/262 |
| 3,340,611 A * | 9/1967 | Lauck | ...................... | B26B 17/02 30/192 |
| 3,559,286 A * | 2/1971 | Pfaffenbach | ............. | A01G 3/02 30/261 |
| 4,073,059 A * | 2/1978 | Wallace | ................... | A01G 3/02 30/261 |

(Continued)

*Primary Examiner* — Jason Daniel Prone

(57) ABSTRACT

A garden shears has a first cutting member, a second cutting member and a protecting member. The first cutting member and the second cutting member are combined adjacent to each other, and the first cutting member and the second cutting member respectively have a blade portion facing the blade portion of the other cutting member. The blades of the first cutting member and the second cutting member are used for opposite positioning cutting, instead of staggered cutting after closing, which can avoid the formation of two different cut surfaces on both sides of the branches. The protecting member has a securing aperture and an arced slot, and the securing aperture is a polygonal aperture with multiple engaging edges.

7 Claims, 7 Drawing Sheets

(56) References Cited

U.S. PATENT DOCUMENTS

| | | | | |
|---|---|---|---|---|
| 4,341,016 | A * | 7/1982 | Harrison | A01G 3/02 30/262 |
| 6,145,203 | A * | 11/2000 | Appleman | B23D 29/02 30/131 |
| 6,829,828 | B1 * | 12/2004 | Cech | A01G 3/02 30/250 |
| 8,109,003 | B2 * | 2/2012 | Liu | A01G 3/02 30/254 |
| 8,393,084 | B2 * | 3/2013 | Azpeitia Urrestarazu | A01G 3/02 30/254 |
| 9,736,990 | B2 * | 8/2017 | Lin | A01G 3/025 |
| 11,123,887 | B2 * | 9/2021 | Heinsohn | B26B 13/16 |
| 2008/0184567 | A1 * | 8/2008 | Jou | A01G 3/02 30/262 |
| 2009/0056147 | A1 * | 3/2009 | Zeng | B26B 13/28 30/271 |
| 2009/0320300 | A1 * | 12/2009 | Liu | B26B 13/16 30/262 |
| 2012/0060376 | A1 * | 3/2012 | Polofsky | B25B 7/18 30/177 |
| 2014/0053413 | A1 * | 2/2014 | Huang | A01G 3/0251 30/252 |
| 2016/0271812 | A1 * | 9/2016 | Yang | B26B 13/28 |
| 2016/0345506 | A1 * | 12/2016 | Lin | A01G 3/021 |
| 2017/0245439 | A1 * | 8/2017 | Nelson | A01G 3/025 |
| 2021/0370533 | A1 * | 12/2021 | Bader | B26B 17/02 |

\* cited by examiner

A-A

B-B

… … …

GARDEN SHEARS

BACKGROUND OF THE INVENTION

Field of the Invention

The present invention relates to garden shears.

Description of the Related Art

Currently, conventional garden shears mainly include two cutting pieces with handles, a middle section of each cutting piece is equipped with the through aperture, and the through aperture is provided with a bolt and a nut to pivot and position the two shearing pieces together. When force is applied to the two handles, the through aperture can be used as the rotating axis to make the garden shears open and close. The opening and closing of the two cutting pieces is used for cutting, and the two cutting pieces can be the cooperation of a blade, an anvil, or directly two blades for interlaced cutting after closing.

The above-mentioned conventional garden shears still has the following problems in practical applications: a blade-anvil style garden shears with single side shearing ability is designed to trim dead or lignified stems and branches of the plant; use of the garden shears on healthy growing plants can result in the plants being crushed, cut or twisted, and then forms uneven cuts, which can lead to the risk of infection of the cuts. 2. The garden shears that utilizes the staggered cutting method of two blades forms two different cut surfaces on both sides of the branches of the plant, so that the trimmed plant cannot be used for grafting.

Therefore, it is desirable to provide a garden shears to mitigate and/or obviate the aforementioned problems.

SUMMARY OF THE INVENTION

An objective of embodiments of the present invention is to provide a garden shears, which is capable of improving the above-mention problems.

In order to achieve the above objective, an embodiment garden shears has a first cutting member, a second cutting member and a protecting member. The first cutting member and the second cutting member are combined adjacent to each other, with the first cutting member and the second cutting member respectively having a blade portion facing the blade portion of the other cutting member, and a connecting portion at a middle section connected to a handle; each connecting portion has a through aperture for accepting a bolt, the bolt engaging with a corresponding nut to form a locking engagement such that the first cutting member and the second cutting member are pivoted together, and the connecting portion of the first cutting member is provided with a threaded aperture. The protecting member has a securing aperture and an arced slot, the securing aperture being a polygonal aperture with multiple engaging edges, such that when the protecting member is jacketed onto the nut, each engaging edge engages with an edge of the nut. A screw is disposed through the arced slot to lock with the threaded aperture, and the protecting member has a curved contacting edge that protrudes when the first cutting member and the second cutting member are opened.

Other objects, advantages, and novel features of invention will become more apparent from the following detailed description when taken in conjunction with the accompanying drawings.

DETAILED DESCRIPTION OF THE PREFERRED EMBODIMENT

Figure 1:
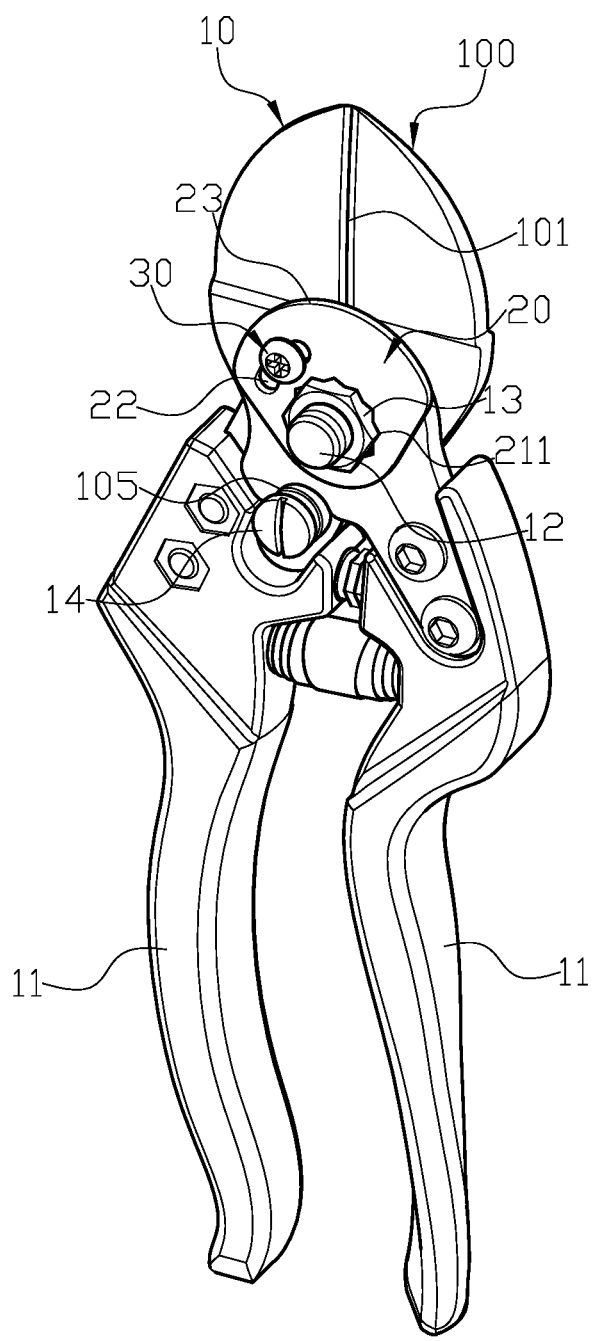
FIG. 1 is a three-dimensional combination drawing of a preferred embodiment of the present invention.
Figure 2:
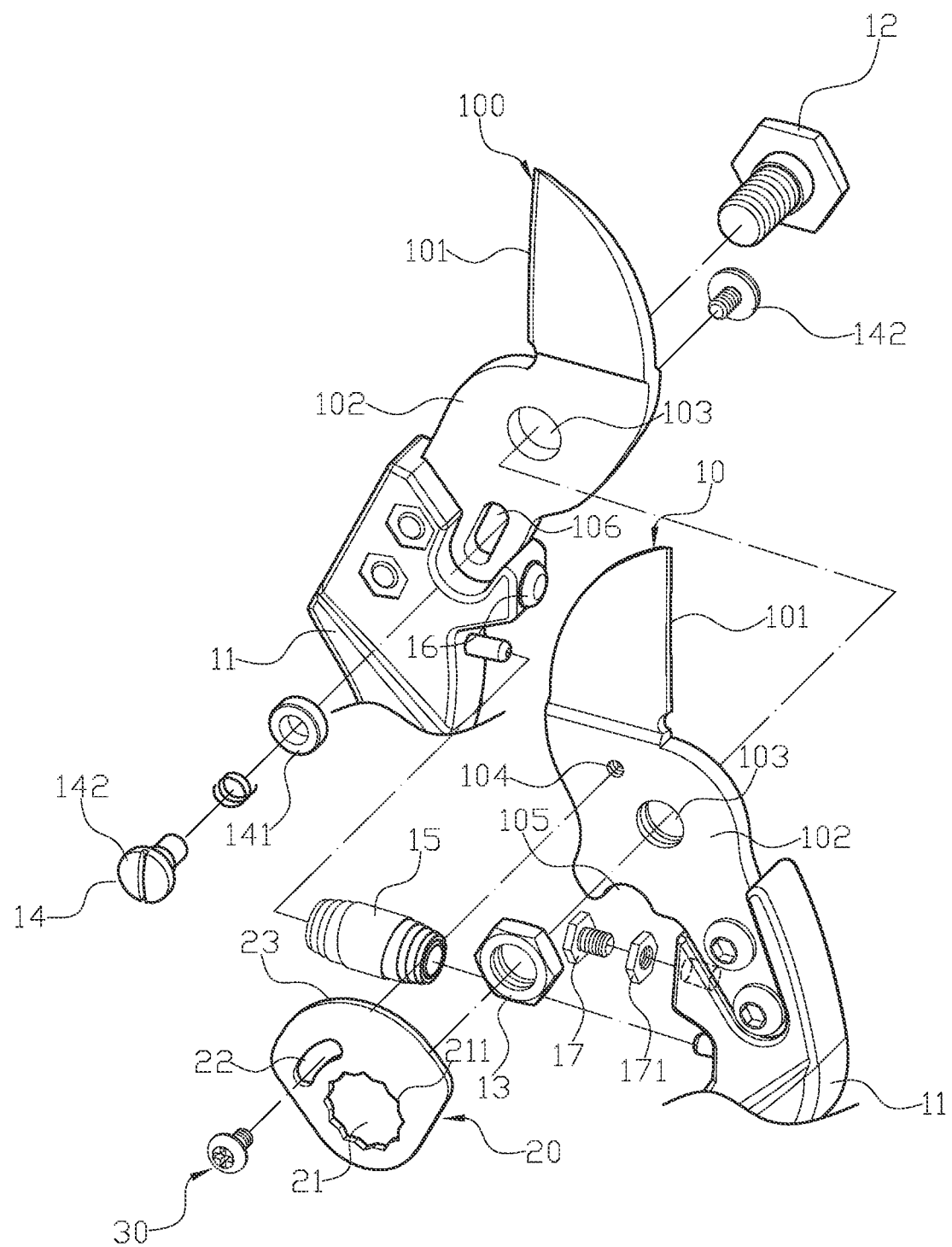
FIG. 2 is a three-dimensional exploded view according to the preferred embodiment of the present invention.
Figure 3:
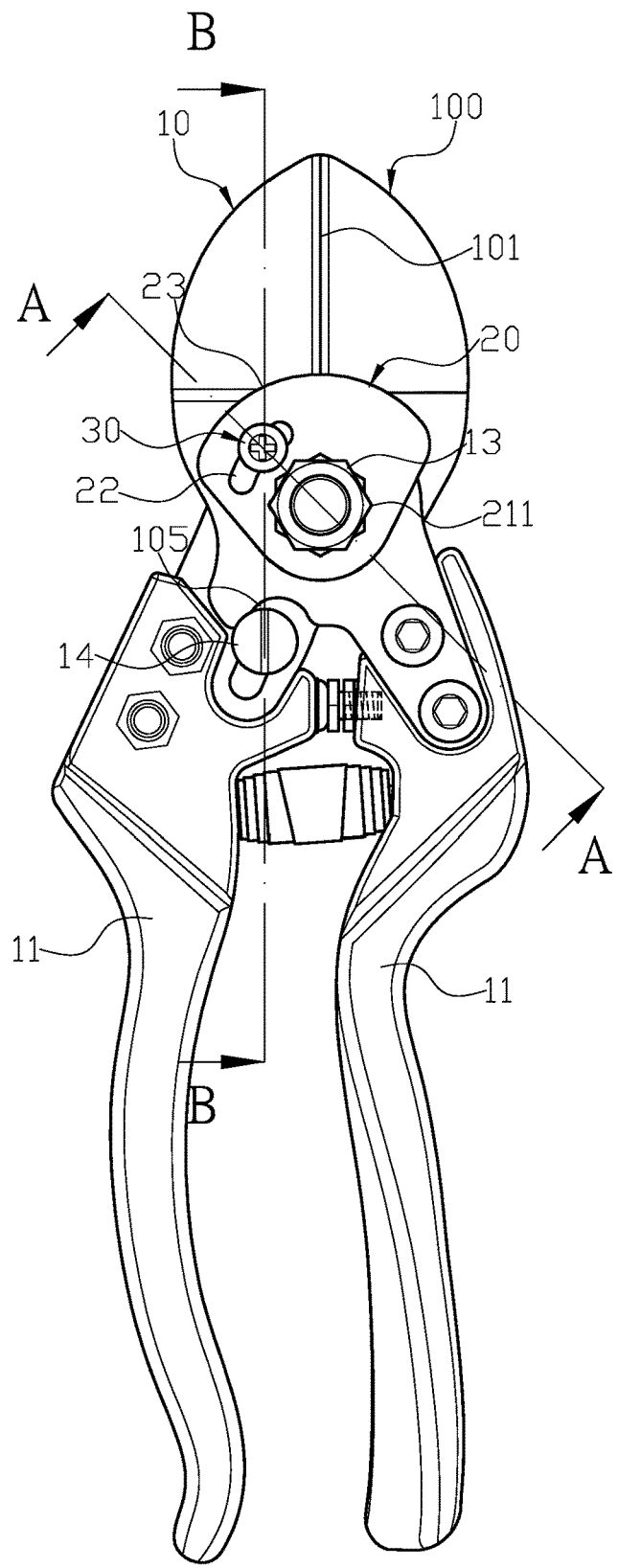
FIG. 3 is the combined plan view of the preferred embodiment according to the present invention.
Figure 4:
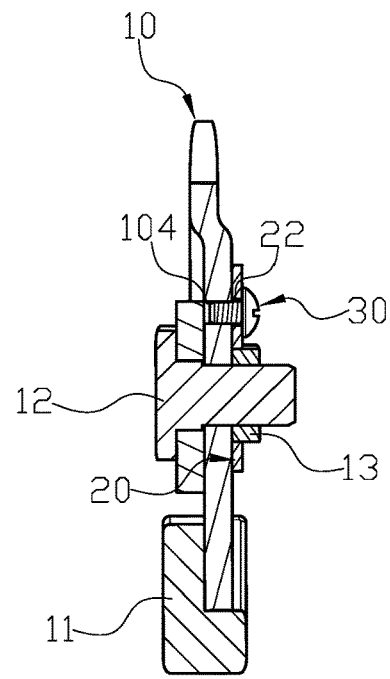
FIG. 4 is a sectional view of FIG. 3 along the line A-A according to the preferred embodiment of the present invention.
Figure 5:
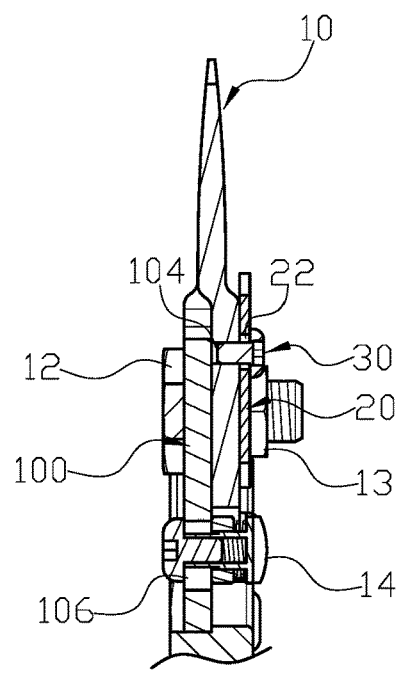
FIG. 5 is a sectional view of FIG. 3 along the line B-B according to the preferred embodiment of the present invention.

Please refer to FIGS. 1-5. A garden shears comprises: a first cutting member 10, a second cutting member 100 and a protecting member 20. The first cutting member 10 and the second cutting member 100 member are combined adjacent to each other, and the first cutting member 10 and the second cutting member 100 respectively have a blade portion 101 facing the blade portion 101 of the other cutting member. Furthermore, the first cutting member 10 and the second cutting member 100 also respectively have a connecting portion 102 at a middle section connected to a handle 11. Each connecting portion 102 has a through aperture 103 for accepting a bolt 12, and the bolt 12 engages with a corresponding nut 13 to form a locking engagement such that the first cutting member 10 and the second cutting member 100 are pivoted together.

When force is applied to the two handles 11, the through aperture 103 can be used as the pivot axis, so that the first cutting member 10 and the second cutting member 100 can be opened and closed. Since the first cutting member 10 and the second cutting member 100 are aligned with each other, after the first cutting member 10 and the second cutting member 100 are forced closer, the blades 101 can be used to cut against each other directly, instead of being interleaved.

Also, the connecting portion 102 of the first cutting member 10 is provided with a threaded aperture 104. The protecting member 20 has a securing aperture 21 and an arced slot 22. The securing aperture 21 is a polygonal aperture with multiple engaging edges 211, such that when the protecting member 20 is jacketed onto the nut 13, each edge of the nut 13 engages with a respective engaging edge 211.

Figure 6:
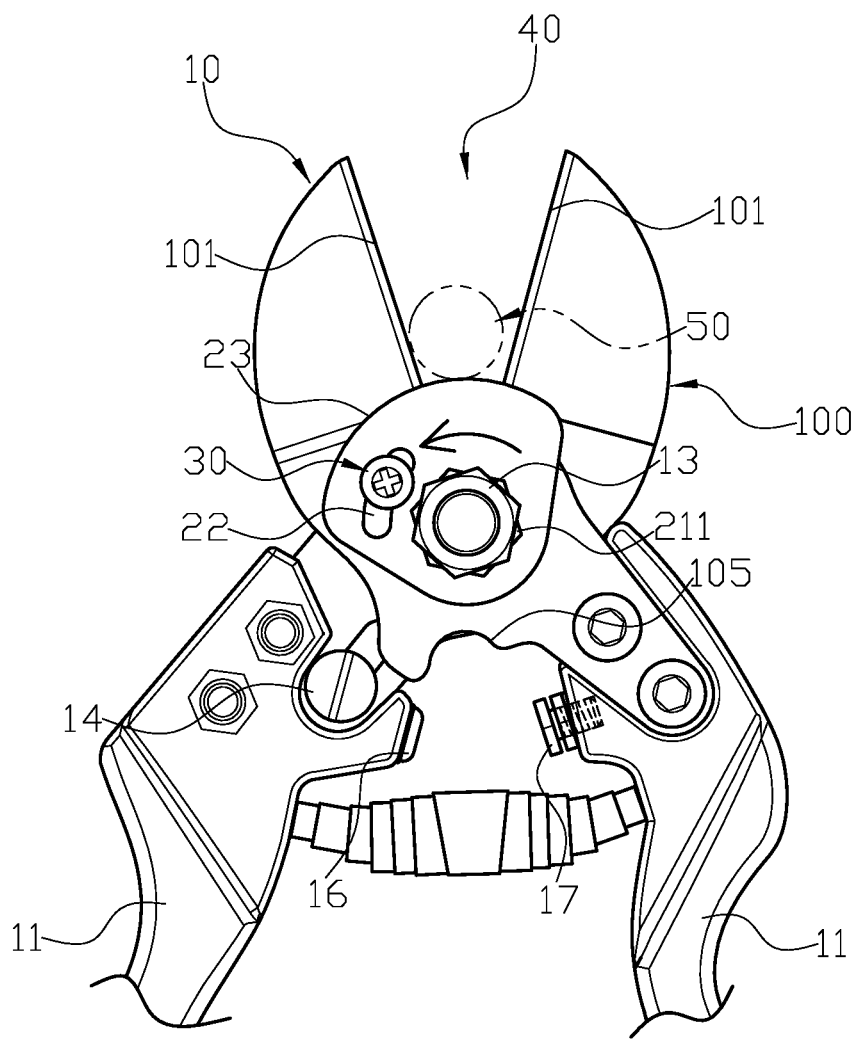
FIG. 6 is the cutting state drawing of the preferred embodiment according to the present invention.

A screw 30 is disposed through the arced slot 22 to lock with the threaded aperture 104, such that the protecting member 20 can be disassembled from the first cutting member 10. Furthermore, the protecting member 20 has a curved contacting edge 23 that overlaps a portion of the blade portions 101 when the first cutting member 10 and the second cutting member 100 are opened such that a space 40 is defined in-between the blade portions 101, and the contacting edge 23 is used as a blocker for a branch 50 of a plant, as shown in FIG. 6, so as to avoid excessive movement of the branch 50 into the opening 40 during cutting, to prevent the components of the garden shears and the branch 50 jamming with each other.

In addition, the connecting portion 102 of the first cutting member 10 has a buckle 105, and the connecting portion 102 of the second cutting member 100 has an elongated hole 106 provided with a push button 14 configured to engage with the buckle 105.

Moreover, the push button 14 comprises a washer 141 and two stoppers 142.

Furthermore, the two handles 11 are biased apart by an elastic member 15, and the elastic member 15 is a barrel spring wound from a metal plate.

Figure 7:
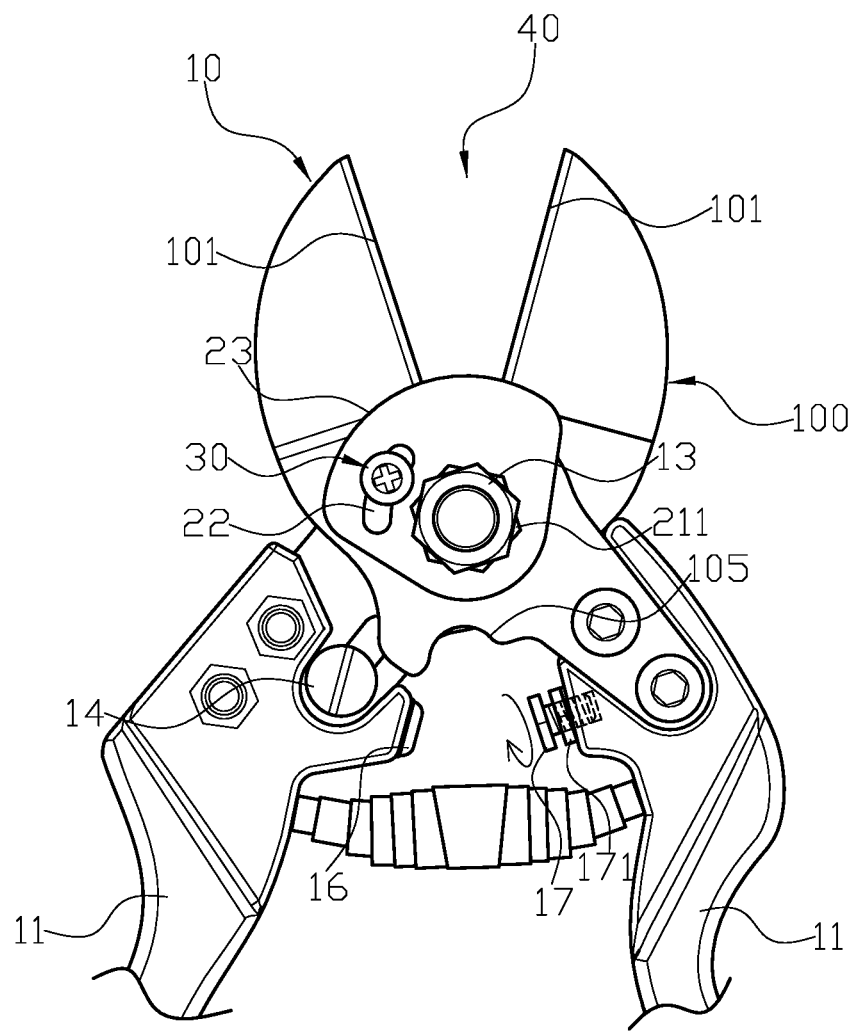
FIG. 7 is the adjustment state drawing of the movable stud according to the preferred embodiment of the present invention.
Figure 8:
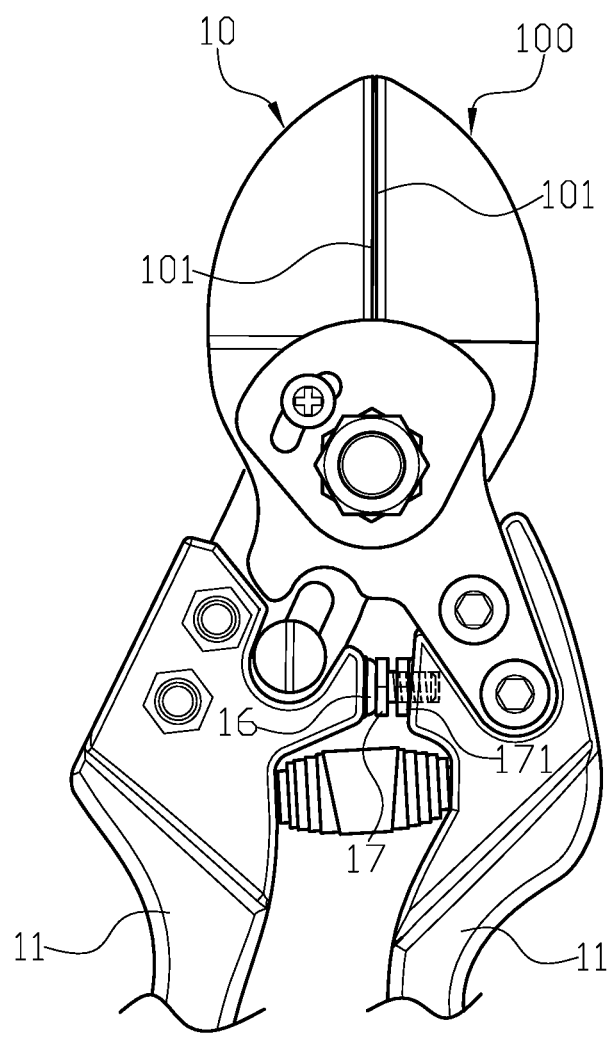
FIG. 8 is a state drawing showing after cutting the two handles can no longer be pressed closer.

Additionally, the two handles 11 respectively have a fixed stud 16 and a movable stud 17, and by changing a protruding length of the movable stud 17, as shown in FIG. 7, a gap is provided between the first cutting member 10 and the second cutting member 100 when the two handles 11 are closed together as shown in FIG. 8, to prevent the first cutting member 10 and the second cutting member 100 from pushing against each other and easily causing the blades 101 to collapse against each other.

Alternatively, both of the two handles 11 respectively have a movable stud 17, and by changing a protruding length of each movable stud 17, a gap is provided between the first cutting member 10 and the second cutting member 100 when the two handles 11 are closed together as shown in FIG. 8, to prevent the first cutting member 10 and the second cutting member 100 from pushing against each other and easily causing the blades 101 to collapse against each other.

Furthermore, the movable stud 17 is a two-way rotation hand screw and paired with a locking nut 171.

Please refer to FIG. 6. In actual use, when the two handles 11 are pressed to release the first cutting member 10 and the second cutting member 100 to open and allow the branch 50 of a plant to be smoothly placed into the opening 40 between the first cutting member 10 and the second cutting member 100. The contacting edge 23 of the protecting member 20 provides a stop to the branch 50 to prevent the branch 50 from moving in too deep to protect the parts of the garden shears. When the two handles 11 are pressed toward together, the blade 101 of the first cutting member 10 and the blade 101 of the second cutting member 100 are aligned to cut the branch 50, so that the two sides of the pruned branch 50 form two aligned cutting surfaces up and down. By rotating the screw 30 to loosen to remove and adjust the protecting member 20, the garden shears can target the plant branches 50 for different trimming angles.

The above-mentioned garden shears structure has the following advantages: First, the first cutting member 10 and the blade 101 of the second cutting member 100 perform double side aligned cutting, which prevents the branch 50 from being crushed, cut or twisted, so that the cut after trimming can be relatively even and flat, so as to greatly reduce the probability of infection of the branch 50 after trimming; secondly, the blades 101 of the first cutting member 10 and the second cutting member 100 are used for opposite positioning cutting, instead of staggered cutting after closing, which can avoid the formation of two different cut surfaces on both sides of the branch 50, making the garden shears very suitable for grafting plants.

Although the present invention has been explained in relation to its preferred embodiment, it is to be understood that many other possible modifications and variations can be made without departing from the spirit and scope of invention as hereinafter claimed.

What is claimed is:

1. A garden shears comprising:
   a first cutting member,
   a second cutting member, and
   a protecting member; wherein:
   the first cutting member and the second cutting member are adjacent to each other, the first cutting member and the second cutting member each having:
   a blade portion, each blade portion facing the blade portion of the other cutting member, and
   a connecting portion at a middle section connected to a handle;
   each of the connecting portions having a through aperture for accepting a bolt, the bolt engaging with a corresponding nut to form a locking engagement such that the first cutting member and the second cutting member are pivoted together, the connecting portion of the first cutting member comprising a threaded aperture; and
   the protecting member has a securing aperture and an arced slot, the securing aperture having a polygonal shape with multiple engaging edges, edges of the nut each engaging with a respective one of the multiple engaging edges of the securing aperture, a screw disposed through the arced slot to lock with the threaded aperture, and the protecting member has a curved contacting edge overlapping a portion of the blade portions of the first cutting member and the second cutting member.

2. The garden shears as claimed in claim 1, wherein the connecting portion of the first cutting member has a buckle, and the connecting portion of the second cutting member has an elongated hole provided with a push button configured to engage with the buckle.

3. The garden shears as claimed in claim 2, wherein the push button comprises a washer disposed between two stoppers.

4. The garden shears as claimed in claim 1, wherein the two handles are biased apart by an elastic member.

5. The garden shears as claimed in claim 1, wherein the two handles respectively have a fixed stud and a movable stud, and by changing a protruding length of the movable stud, a gap is provided between the first cutting member and the second cutting member when the two handles are pivoted together such that the fixed stud engages the movable stud.

6. The garden shears as claimed in claim 5, wherein the movable stud is a two-way rotation hand screw.

7. The garden shears as claimed in claim 5, wherein the movable stud is a two-way rotation hand screw, and the hand screw is provided with a securing nut.

\* \* \* \* \*